Aug. 14, 1962 I. W. BORUTZKE ET AL 3,049,289
ITEM COUNTER MECHANISM
Filed Oct. 14, 1959 6 Sheets-Sheet 2

INVENTORS.
IRVIN W. BORUTZKE.
BY J. K. BLANKENSHIP.

Harry R. Dumont
ATTORNEY.

INVENTORS.
IRVIN W. BORUTZKE.
J.K. BLANKENSHIP.
BY Harry R. Dumont
ATTORNEY.

United States Patent Office 3,049,289
Patented Aug. 14, 1962

3,049,289
ITEM COUNTER MECHANISM
Irvin W. Borutzke and Joseph K. Blankenship, Detroit, Mich., assignors to Burroughs Corporation, Detroit, Mich., a corporation of Michigan
Filed Oct. 14, 1959, Ser. No. 846,440
13 Claims. (Cl. 235—60)

This invention relates to accounting machines in general and more particularly to a remote item counter mechanism therefor.

It is found desirable in many types of accounting machines, cash registers, and the like to maintain a record of the number of items entered and processed during a given period. Modern accounting machines are generally equipped with a plurality of accumulators which may be selected either by manual key depression or by carriage position. When there are several accumulator sections each of which has a plurality of individual accumulators, obvious space limitations exist which make it impractical to incorporate an individual counter for each individual accumulator within the case of the machine. However, in certain types of business, collection of accurate count data on certain types of items may be of the utmost importance. The present invention is directed toward the provision of a simple electrically operated item counter adjunct which automatically and accurately maintains such item count data. The item counter is designed to operate without a motor thus reducing power requirements and also has a simplified electrical actuating system which permits assembly into a relatively compact unit.

It is an object of this invention to provide an improved electrical remote item counter for an accounting machine.

It is a further object to provide a disabling system to prevent counter actuation in non-add operations in either or both accumulator sections.

It is an additional object to provide an improved electromechanical counter actuator mechanism.

It is a further object to provide a system providing for disabling of the item counter on idle stroke operation of the accounting machine.

It is still a further object to provide a system for disabling of the counter wholly or partially in total or sub-total operation in one or more of a plurality of accumulator sections in the accounting machine.

In accordance with the foregoing objects and first briefly described herein, the invention comprises a remote item counter adapted for use with a key-set, cyclically operative accounting machine which has a plurality of differentially positionable add racks, a plurality of accumulators for storing data entered into the accounting machine, accumulator selection means positioning the data racks relative to a selected accumulator for entry of data therein, and selectively actuable function control means. The item counter has an electrical power supply, a plurality of counters corresponding to the plurality of accumulators in the accounting machine, electrical selection means to select one or more of the counters and electrical drive means to actuate the selected counter or counters. The energization of the selection means and drive means is controlled by timing switches which in turn are controlled by timing cams mounted on the main drive shaft of the accounting machine.

The invention is illustrated for use as an adjunct to an accounting machine of the basic type disclosed in United States Patent No. 2,629,549 issued to Thomas M. Butler on February 24, 1953 and more specifically to a multiple register machine of the type disclosed in United States Patent No. 2,721,695 issued to Thomas M. Butler et al. on October 25, 1955. A brief description of the pertinent features of this machine will serve to clarify the operation of the preferred embodiment of our invention in connection therewith. The accounting machine is a key-set, electric motor driven cyclically operable, full keyboard machine with a traveling paper carriage and manual and automatic selection and control of machine functions adapted to perform a variety of accounting, bookkeeping and other work involving mechanical calculation. It is provided with at least two adding and subtracting mechanisms or totalizers hereinafter referred to as accumulator sections having a plurality of individual storage registers adapted for both positive and direct negative total taking operation hereinafter referred to as accumulators. The manual and automatic controls of the operation and functions of the accumulator sections are such that either accumulator section may be selected to perform any of its several functions in any cycle of operation of the machine, or both may be selected for simultaneous subtraction in both, addition in either with subtraction in the other, or the taking of a positive or true negative total or subtotal from either with or without simultaneous additive or subtractive transfer of the total or subtotal to the other in the same cycle of operation of the machine. The machine has a plurality of key banks with one differentially positioned data rack for each key bank. A row of nine accumulator selection keys is provided together with two rows of function control keys, one row for each section of nine accumulators. The operation of the preferred embodiment of the invention will be described with reference to the manual controls on the illustrated accounting machine with the objective of providing the simplest and most straight forward presentation possible.

Figure 1:
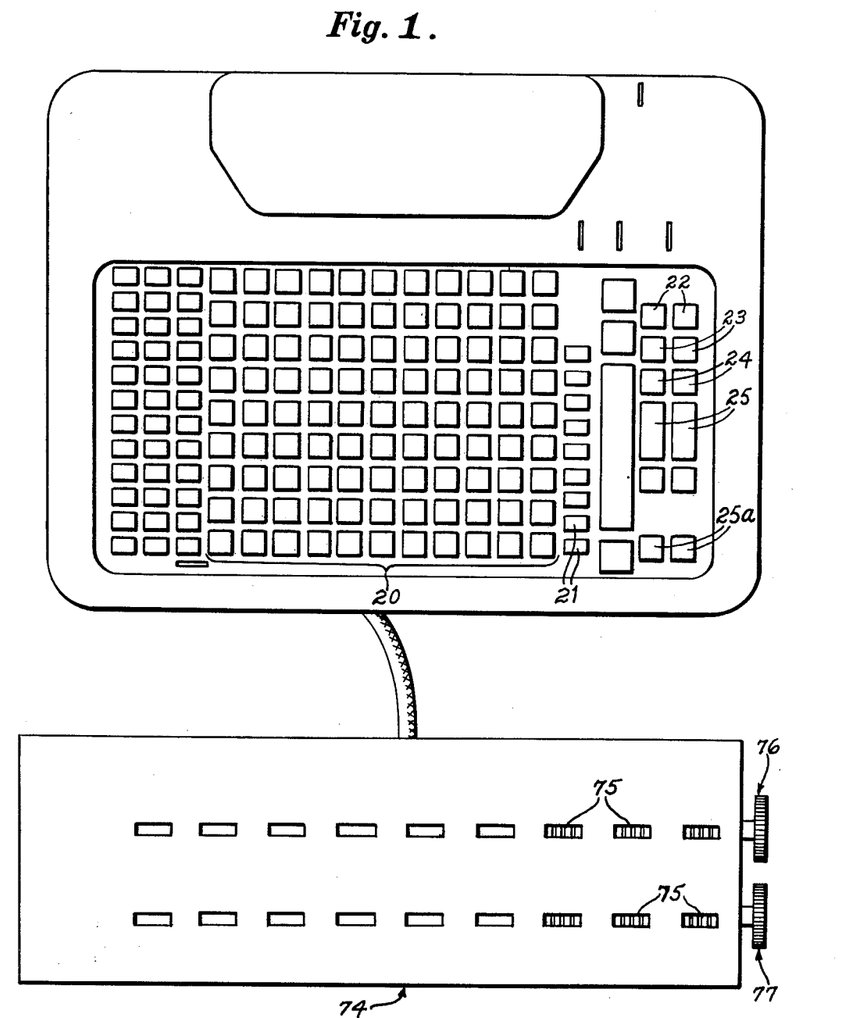
FIG. 1 is a plan view of the accounting machine keyboard and the remote item counter.

In FIG. 1 is shown the keyboard of the accounting machine including the amount keys 20 arranged in vertical listing banks. Included are a plurality of accumulator selection means here shown as nine accumulator selection keys 21, and two rows of function control means described as total keys 22, sub-total keys 23, non-add keys 24, subtract keys 25 and add keys 25a. Each vertically disposed row of the above mentioned function control keys is adapted to control one of the two accumulator sections 41 or 42 which will be hereinafter more fully described. Also shown is a view of the remote dial counter unit 74 having two horizontal rows of viewing apertures with counters 75. The top row of nine counters corresponds to the nine accumulators in accumulator section 42 and the bottom row to the nine accumulators in accumulator section 41. Reset knobs 76 and 77 are indicated for each accumulator section.

Figures 2, 3, 9:
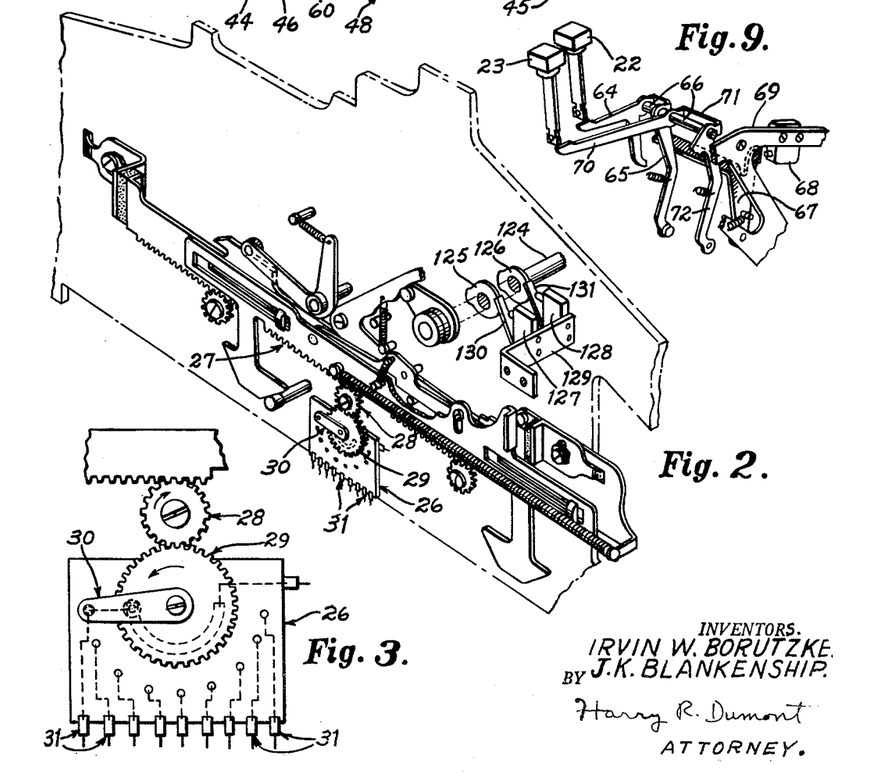
FIG. 2 is a perspective view of an accumulator selection slide together with a rotary printed circuit switch and a fragmentary portion of the main drive shaft with associated timing cams and switches.
FIG. 3 is a detail of the printed circuit switch.
FIG. 9 is a perspective of total and subtotal functional control key mechanisms with associated switches.

In FIG. 2 a multiple position switching means herein shown as a printed circuit switch 26 is shown mounted on the left side of the accounting machine frame beneath an accumulator selection means here shown as the accumulator selection slide 27 of the type illustrated in FIG. 1b of aforementioned U.S. Patent 2,721,695. A rack gear portion of accumulator selection slide 27 engages pinion 28 which meshes with pinion gear 29 mounted centrally on printed circuit switch 26 and carrying contact arm 30. Accumulator selection slide 27 has nine differential positions each corresponding to one of the nine accumulators as positioned by one of the accumulator selection keys 21 (FIG. 1). The contact arm 30 will be positioned through the gear train provided therefore to select one of nine terminal contacts 31. FIG. 2 also shows the main drive shaft 124 of the accounting machine having two timing cams 125 and 126 mounted on the left side thereof. A pair of normally open timing switches 127 and 128 are mounted to the accounting machine frame by a bracket 129 with their movable actuators 130 and 131 aligned in opposition to the cam surfaces of timing cams 125, 126. Timing cam 126 operates first during the cycle of the accounting machine to close the timing switch 128 at approximately 150° to actuate one of the nine clapper solenoids 98 (FIG. 11) in the item counter and it then dwells for approximately 50°. Timing cam 125 operates to close the timing switch 127 at approximately 170° to actuate one or both of a pair of counter drive solenoids 78, 79 (FIG. 11) and it then dwells for approximately 20°. The operating and timing cams 125, 126 with their associated switches 127, 128 will be discussed more fully hereinafter in connection with the total cooperation of accounting machine and item counter.

FIG. 3 is an enlarged elevation of printed circuit switch 26 showing the elements referred to in connection with FIG. 2.

Figure 4:
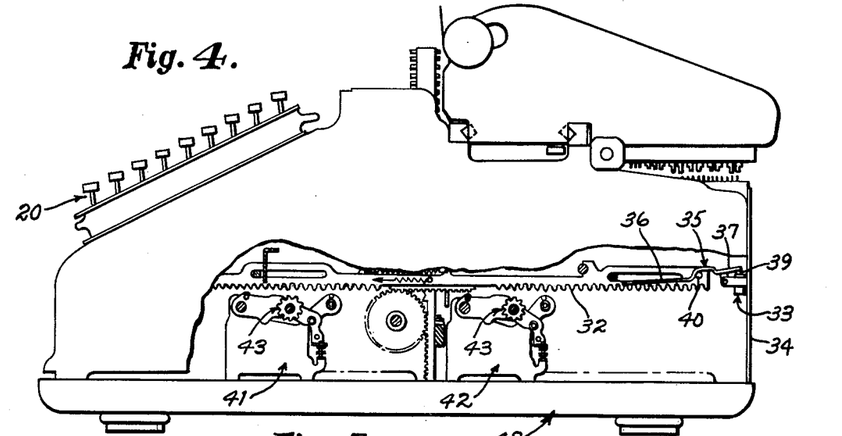
FIG. 4 is a fragmentary right side elevation view of the accounting machine with parts broken away to show an add rack with its sensing bail and switch.

FIG. 4 shows the accounting machine with one of the data racks hereinafter referred to as add rack 32 in its home or rearward position. An idle stroke sensing switch 33 is mounted in the machine centrally on the machine back plate 34 in a normally open position when all add racks 32 are in their home position. Also shown are accumulator sections 41 and 42 carrying accumulators 43 which are extensively similar to the multiple register unit as illustrated in FIGS. 2, 3, and 5 of U.S. Patent 2,721,695 previously referred to.

Figure 5:
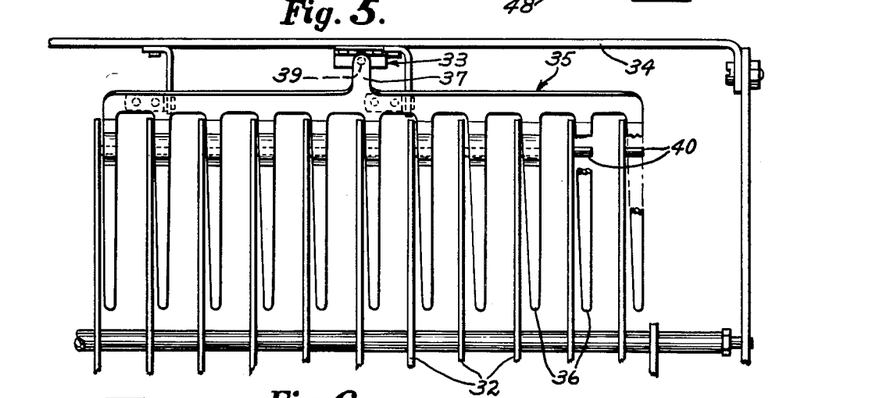
FIG. 5 is a plan view of the add rack sensing bail.

FIG. 5 shows a comb-like sensing bail 35 with a plurality of fingers 36, one adjacent to and in longitudinal alignment with each add rack 32. The bail 35 is mounted pivotally on the back plate 34 near the idle stroke sensing switch 33. A downwardly projecting arm 37 is located above contact actuator 39 of switch 33. A stud 40 is mounted on each add rack 32 near its rearward end portion.

Figure 6:
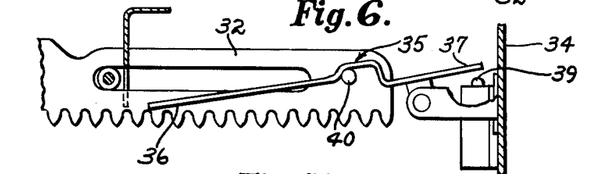
FIG. 6 is a fragmentary right elevation of the add rack and sensing bail with the add rack in its home position.

FIG. 6 shows the manner in which each finger 36 of the sensing bail is downwardly bent and stepped so that movement of one or more add racks 32 forwardly in the machine from their home position past a predetermined position will cause their stud or studs 40 to bear against the finger 36 and rock the forward portion of pivotally mounted sensing bail 35 upwardly so that its arm 37 will depress contact actuator 39 of idle stroke sensing switch 33 whereby the normally open idle stroke sensing switch 33 is closed. Since only one idle stroke sensing switch 33 is provided for the plurality of add racks, movement of a single add rack 32 will cause the switch 33 to close. In the event the machine performs a cycle with an idler stroke i.e., one in which no entry has been made on the amount keys, the switch will remain in its normally open position and no count can be registered in the remote counter unit.

Figure 7:
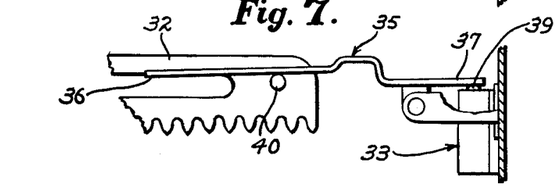
FIG. 7 is a fragmentary right elevation of the add rack and sensing bail with the add rack in a forward position.

FIG. 7 illustrates an add rack in a forward position so as to pivot the bail 35 and cause arm 37 to depress contact actuator 39 to close switch 33.

Figure 8:
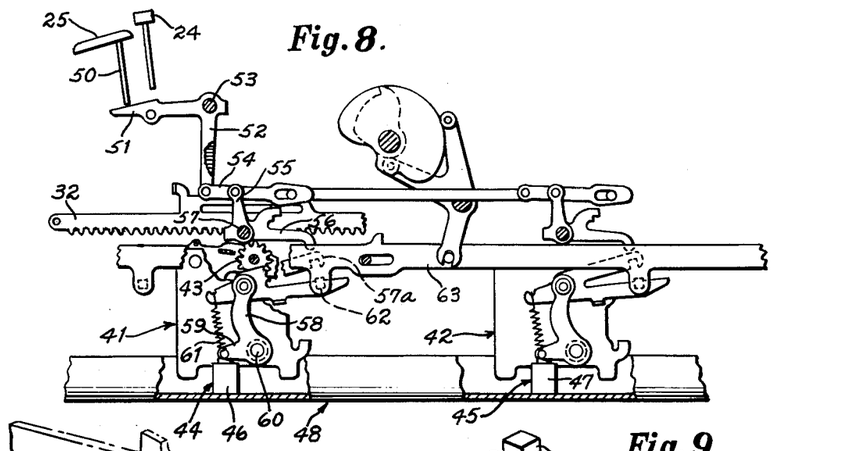
FIG. 8 is a right side elevation of the accounting machine showing portions of the accumulator mechanism and switches associated therewith.

FIG. 8 shows a right sectional elevation portion of the accumulator mechanism of the accounting machine with switches 44 and 45 mounted on plates 46 and 47 respectively which are mounted on the machine base 48. When the accumulators 43 move into mesh with an add rack 32 from performing either an add or subtract operation in either of the accumulator sections 41 and 42, the normally open switches 44 or 45 are closed. As an example of how the switches 44 and 45 operate, we will consider in detail a subtract operation in accumulator section 41, following depression of subtract key 25 (FIG. 1) which is located in the row of function control keys for accumulator 41. The lower end of the stem 50 of the subtract key 25 is immediately above the forward arm 51 of a bell crank 51, 52 supported on stud 53. The downward arm 52 of the bell crank carries a stud rotatably secured in a link 54 the forward end of which is pivotally connected with the upper arm 55 of a bell crank 55, 56 rockably mounted on a long stud 57 extending rightwardly from the machine frame 48. The rearwardly extending arm 56 of the bell crank 55, 56 has a slightly downwardly turned rear end portion immediately above and in vertical alignment with the rear end portion of the upper rear arm of the link 57a. Rotatably secured by a stud to link 57a is bell crank 58, 59 mounted on shaft 60. A biasing spring 61 connects the forward end of link 57a with the forward end of arm 59 of bell crank 58, 59. When the subtract key 25 is depressed, the arm 51 is depressed, the arm 52, link 54 and arm 55 are swung rearwardly and the arm 56 is depressed to lower the rearward arms of the link 57a to disengage the lower arm from a stud 62 and connect the notched rear end of the upper arm of the link 57a to the stud 62 secured in a downward projection of a slide 63 and the pinions of accumulator 43 mesh with add rack 32. A force exerted upwardly by the forward portion of link 57a through biasing spring 61 urges arm 59 of bell crank 58, 59 upwardly around shaft 60 to move its forward abutting edge away from the contact actuator of switch 44 to permit the normally open switch to close whenever accumulators 43 are engaged with an add rack 32. Similarly in an add operation, the pinions of accumulator 43 are in mesh with an add rack 32 and the switch 44 is permitted to close.

It is appropriate to consider the non-add operation in connection with FIG. 8. When the non-add control means non-add key 24 (one for each accumulator section 41 and 42) is depressed, the lower end of its stem engages and depresses the arm 51 but only about half as far as that arm is depressed by depression of the subtract key. Such depression of the arm 51 by the non-add key 24 affects, through the above described connections 51 through 56, a clockwise rocking of the connecting link 57a sufficient to disconnect the lower arm of the latter from the stud 62 but insufficient to connect the upper arm of the link 57 to a stud 62 secured on a downward projection of a slide 63. The rocking movement also is insufficient to exert required force to urge arm 59 of bell crank 58, 59 upwardly around shaft 60 to move its forward abutting edge away from switch 44 to permit the normally open switch to close. Thus if either accumulator section 41 or 42 is non-added, its switch 44 or 45 will remain open and the circuit to the remote counter will remain open.

In FIG. 9 are shown portions of the total and sub-total control means of the accounting machine. When total key 22 is depressed, its stem will depress arm 64 of bell crank 64, 65 and force arm 65 to move rearwardly about shaft 66 against a lateral extension of switch actuating member 67 to open the normally closed switch 68. Switch actuating member 67 is pivotally mounted on and switch 68 is rigidly mounted on auxiliary side frame 69. If sub-total key 23 is depressed, its stem will depress arm 70 of yoke member 71 which is mounted on shaft 66 and downward projecting arm 72 of yoke member 71 will bear against the lateral extension of switch actuating member 67 and open the normally closed switch 68. Sections 41 and 42 each having individual total and sub-total keys 22 and 23 as previously described in connection with FIG. 1 with identical switches 68 and switch disabling mechanisms as hereinabove described. Since only add and subtract items are to be registered on the item counter, the circuit to the item counter will be opened upon a total or sub-total operation in either accumulator section.

Figure 10:
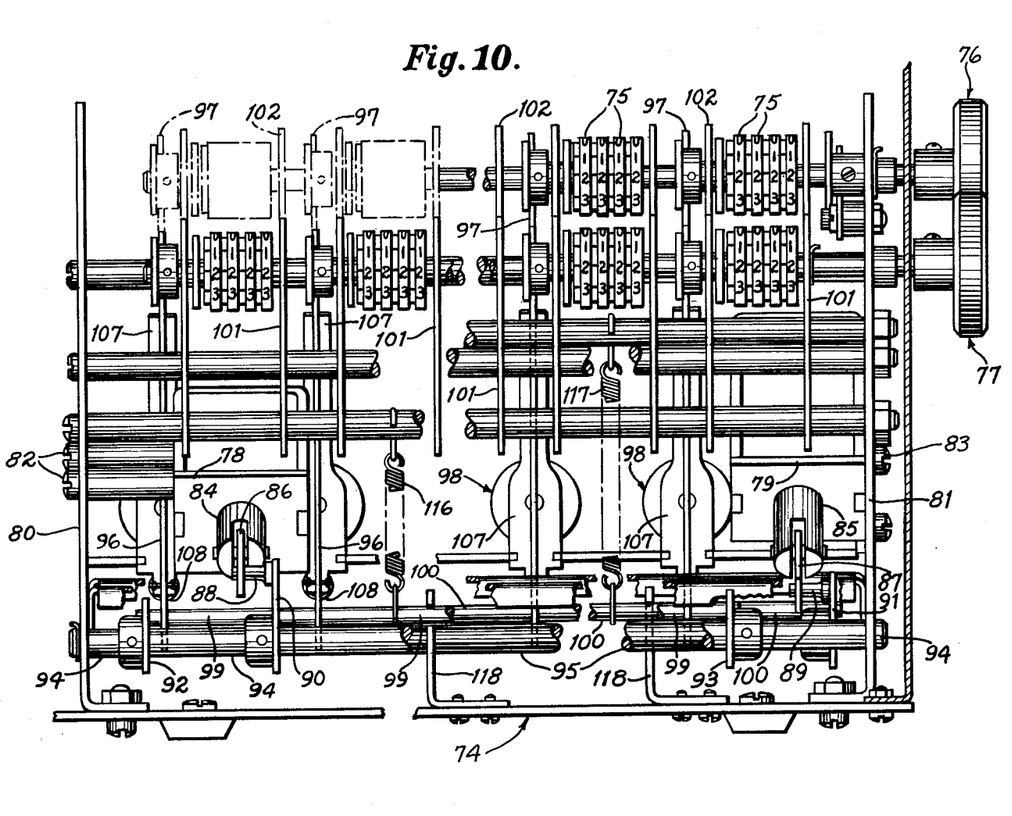
FIG. 10 is a top plan view of the item counter mechanism.

FIG. 10 shows the remote item counter 74 with one of the two reset knobs 76 and 77 together with a part of the gear train mechanism which zeroizes the counters 75 in one or both rows of counters, each row comprising a counter section corresponding to accumulator sections 41 or 42 in the basic accounting machine. Electrical drive means here shown as a pair of plunger type drive solenoids 78 and 79 are mounted on end plates 80 and 81 by studs 82 and 83 respectively. The drive solenoids 78 and 79 have plunger portions 84 and 85 pinned to links 86 and 87 respectively. Links 86 and 87 are pinned by studs 88 and 89 to arms 90 and 91 of bell cranks 90, 92 and 91, 93 which are shown in their entirety in FIG. 11. Two shafts 94 and 95 extend transversely with their ends rotatably mounted between the end plates 80 and 81 with bell cranks 90, 92 and bell crank 91, 93 rigidly mounted on these shafts, at the left and right sides of the item counter respectively. Means to couple each selected counter to a drive solenoid are provided by two banks of nine actuating members also referred to herein as actuator hooks 96, 97 (shown in FIG. 11) which are aligned transversely in the central portion of the machine, each pair of hooks having opposed to it an electrical selection means shown as a clapper solenoid 98. Two hook actuating bails 99 and 100 extend transversely across the machine with bail 99 journalled in arm 92 of bell crank 90, 92 and bail 100 journalled in arm 93 of bell crank 91, 93.

Figure 11:
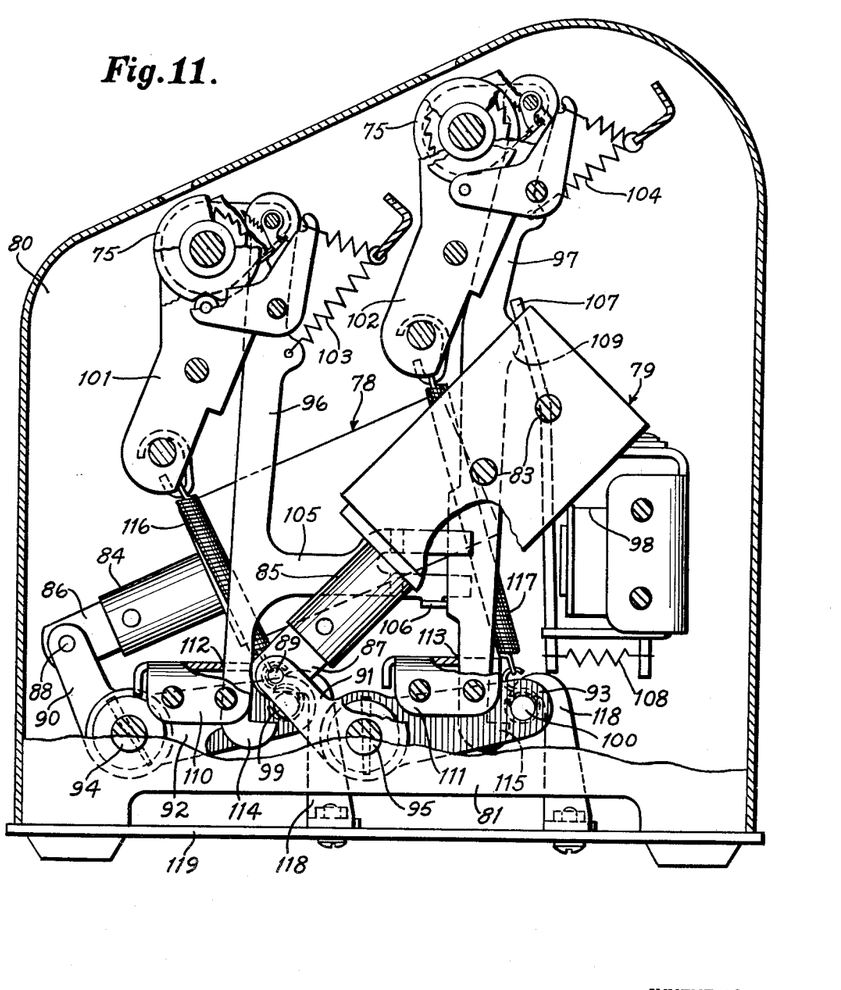
FIG. 11 is a right side elevation of portions of the remote control counter mechanism.

FIG. 11 shows a right side elevation of the item counter mechanism and a pair of actuator hooks 96 and 97. Each pair of actuator hooks 96 and 97 is in alignment with one of the electrical selection or coupling control means here shown as nine clapper solenoids 98 and each hook 96 or 97 is pivotally mounted at its upper end on a link hereinafter referred to as counter dial actuating member 101 or 102, which is connected to a ratchet wheel counter of a type well known in the art. Each actuator hook 96 or 97 is biased rearwardly by the action of springs 103 or 104. In addition, each actuating hook 96 has a rearwardly extending forked arm 105 with a projection 106 which abuts against the forward edge of the longitudinally aligned actuating hook 97. The clapper solenoid 98 has a clapper 107 biased in a forward direction by spring 108 when the clapper solenoid is in its unenergized condition so that the clapper bears against actuator hook 97 at its projection 109. A comb-like series of nine guide strips 110 and nine guide strips 111 are anchored transversely in the item counter each of which guide strips has a step 112 or 113 against which the forward edges of the lower portions of actuator hooks 96 or 97 abut respectively when the aligned clapper solenoid 98 is in its aforementioned unenergized condition. A hooked portion 114 or 115 is formed at the lower end of each actuator hook 96 or 97 respectively which is in horizontal alignment with hook actuating bail 99 or 100. When clapper solenoid 98 is energized its clapper 107 is moved rearwardly against the biasing force of spring 108 permitting actuator hook 96 and 97 to be urged rearwardly by springs 103 or 104 so that their hook portions 114 and 115 engage hook actuating bails 99 and 100. Subsequently, if drive solenoid 78 is energized the bail 99 will be moved downwardly through the action of plunger portion 84, link 86, shaft 94 and bell crank 90, 92 or if drive solenoid 79 is energized the bail 100 will be moved downwardly through the action of plunger portion 85, link 87, shaft 95 and bell crank 91, 93. The downward movement of the bail 99 or 100 will move is associated actuator hook 96 or 97 downwardly and cause a downward movement of the counter actuating member 101 or 102 and enter a "one" count into the counter 75 representing the accumulator 43 in the accumulator section 41 or 42 selected in the accounting machine. When the drive solenoid 78 and 79, and clapper solenoid 98 have been de-energized the bails 99 and 100 are moved upwardly to their original positions by the action of biasing spring 116 and 117 and the hook portions 114 and 115 of actuator hooks 96 and 97 are moved forwardly out of engagement with the bails by the biasing force of spring 108 transmitted through clapper 107, projection 109 on actuator hook 97, and projection 106 on forked arm 105 on actuator hook 96. Thus the actuator hooks 96 and 97 are restored to their original positions abutting on steps 112 and 113 of guide strips 110 and 111 in preparation for another count entry. The upward excursion of bails 99 and 100 is limited by a pair of hooked stop members 118 which are rigidly mounted on the machine base 119.

Figure 12:
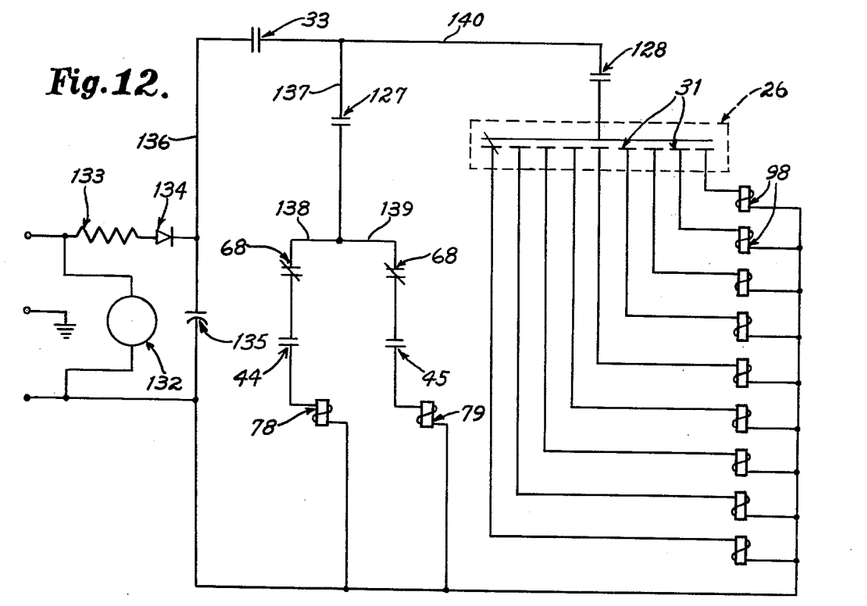
FIG. 12 is a schematic diagram of the circuit employed to operate the item counter unit.

FIG. 12 shows a schematic drawing of the circuitry to control the operation of the item counter 74 as related to the functions of the accounting machine. A power supply of alternating current is connected to the terminals of accounting machine motor 132. A resistor 133 and a semi-conductor diode 134 are connected in series, and a capacitor 135 in parallel thereto to provide electrical power supply of pulsating direct current. Branch 136 includes idle stroke sensing switch 33 (FIG. 4). Lead 137 includes timing switch 127 (FIG. 2) and has parallel branch 138 which energizes drive solenoid 78 for accumulator section 41 (FIG. 8) of the accounting machine by its normally closed switch 68 (FIG. 9) and its normally open switch 44 (FIG. 8). A second parallel branch 139 controls the drive solenoid 79 for accumulator section 42 (FIG. 8) of the accounting machine by its normally closed switch 68 and its normally open switch 45 (FIG. 8). Lead 140 includes timing switch 128, (FIG. 2) and printed circuit switch 26 (FIGS. 2 and 3) which controls selection of one of the nine clapper solenoids 98 (FIG. 11) through the terminal contacts 31 (FIG. 2) of printed circuit switch 26 to correspond with the individual accumulator 43 (FIG. 8) selected.

Figure 13:
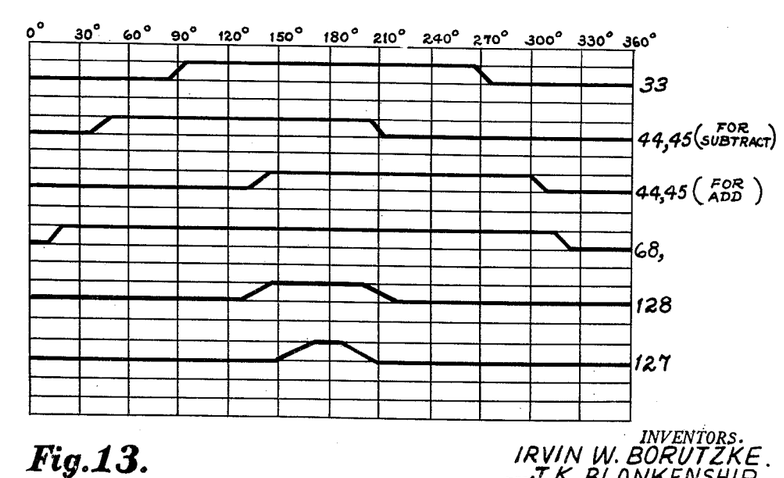
FIG. 13 is a timing chart showing the operation of the item counter in conjunction with the accounting machine.

FIG. 13 is a timing chart in which the various graph lines are designated by the same reference numerals as those identifying the parts, the timing of which is depicted by such graph lines. Idle stroke sensing switch 33 (FIG. 4) is closed whenever any of the add racks 32 (FIG. 4) moves from its normal position and remains closed from 100° to 268° during the cycle of the adding machine. Switches 44 and 45 (FIG. 8) which control drive solenoids 78 and 79 respectively are closed when the accumulators 43 (FIG. 8) move into mesh with an add rack 32 for performing either an add or a subtract operation. For a subtract operation in one or both of these accumulators one or both of the switches 44, 45 remain closed from 50° to 200°. For an add operation one or both of these switches remain closed from 145° to 300°. Switches 68 are normally closed so long as no total key 22 or sub-total key 23 (FIG. 9) is depressed in either accumulator section function control key row (FIG. 1). Their period of closure is from 15° to 315°. Timing switch 128 (FIG. 2) is closed from 150° to 200° by the action of timing cam 126. Timing switch 127 (FIG. 2) is closed from 170° to 190° by the action of timing cam 125.

In order to fully understand the operation of the item counter, we will follow through a cycle of operation on the accounting machine. One or more of the amount keys 20 is depressed to predetermine the differential position of their associated add racks. A machine cycle may be initiated by the motor bar or one of the live keys, total, sub-total, or subtract keys as described in the aforementioned Butler patent. If the cycle initiated is one wherein no add rack movement is initiated, the idle stroke sensing switch 33 will remain open so that no count can be entered into the item counter. We shall consider an operation where one of the function control keys is depressed in one of the two rows of keys which include a total key 22, sub-total key 23, non-add key 24, subtract key 25, and add key 25a. If a total key 22 or sub-total key 23 is selected in either row, the corresponding switch 68 is opened in the accumulator section controlled thereby so that the drive solenoid 78 or 79 in the item counter cannot subsequently be operated and no count can be initiated in the item counter. Similarly, if a non-add key 24 is depressed in either row, switch 44 or 45 will remain open so that drive solenoid 78 or 79 in the item counter cannot be operated and no count can be initiated. However, if an add key 25a or subtract key 25 is depressed the accumulator 43 of the selected accumulator section 41 or 42 will mesh with the add rack 32 and switch 44 or 45 will be closed preparatory to operation of one or both drive solenoids 78 or 79. Depression of one of the nine accumulator selection keys 21 will effect differential movement of the accumulator selection slide 27 to one of its positions whereby printed circuit switch 26 has its contact arm 30 moved to select the appropriate terminal contact 31 and connection to one of the clapper solenoids 98 in the item counter. The actual energizing of the various solenoids in the item counter is now controlled by the timing cam 126 which closes timing switch 128 to energize one of the nine clapper solenoids 98 whereby the selected pair of actuator hooks are moved rearwardly in the item counter to engage hook actuating bails 99 and 100. Timing cam 125 next closes timing switch 127 to energize one or both of the drive solenoids 78 and 79 whereby the bails 99 or 100 are moved downwardly whereby a "one" count is entered into counter 75 corresponding to the clapper solenoid 98 previously energized and corresponding to the accumulator 43 and accumulator section 41 or 42 selected on the keyboard of the accounting machine. Subsequently, the timing switch 127 is reopened to de-energize the drive solenoids 78 or 79, the bails 99 and 100 move upwardly to their former position, timing switch 128 is re-opened so the clapper solenoid 98 is de-energized, the actuator hooks 96 and 97 move forwardly in the item counter out of engagement with the bails 99 and 100 and the parts of the item counter are restored preparatory to another count cycle.

It will be apparent that the invention may be varied in its physical embodiment without departing from the true spirit of the invention.

What is claimed is:

1. In combination, a plurality of banks of links, a like plurality of banks of actuating members each pivotally connected at one end to a different one of said links and having a hooked portion at the other end thereof, means yieldingly urging said links against movement by said actuating members, a plurality of bails each juxtaposed to said hooked portions of a different bank of said actuating members, a plurality of electromagnetic drive means each coupled to a different one of said bails, electromagnetic selection means including a single bank of coupling control magnets corresponding in number to the number of actuating members of only one bank of actuating members and selectively operable to couple the hooked portion of a different one of the link actuating members in each of said plurality of banks of actuating members to the bail for each bank of actuating members, switch means in circuit with and affording a selection of any one of said magnets, and additional switch means separate and distinct from said first mentioned switch means in circuit with and affording a selection of any of said electromagnetic drive means.

2. In combination, a pair of counter actuating members, a pair of electromagnetic drive means each adapted to be coupled to a different one of said actuating members, electromagnetic selection means controlling the coupling of each of said drive means with a different one of said actuating members, switch means in circuit with and controlling the energization of said electromagnetic selection means, and additional switch means in circuit with and controlling the energization of said electromagnetic drive means.

3. In combination, a pair of aligned counter actuating members, electromagnetic selection means having a movable element aligned with said actuating members, first biasing means urging one of said actuating members to abut against the other actuating member, second biasing means urging said movable element against said other actuating member during the unenergized condition of said electromagnetic selection means, electromagnetic drive means adapted to be coupled to at least one of said actuating members by said electromagnetic selection means, switching means in circuit with and controlling the energization of said electromagnetic selection means, and additional switching means separate and distinct from the first mentioned switching means in circuit with and selectively controlling the energization of said electromagnetic drive means.

4. The combination with a key-set, cyclically operable accounting machine having a keyboard for entering data therein and initiating cyclical operations thereof, a plurality of differentially positionable data racks, several accumulator sections each having the same number of accumulators for storing data entered in said accounting machine, accumulator selection means selecting an accumulator in each accumulator section for cooperation with said data racks, and accumulator section selection means affording a selection of any of said accumulator sections for cooperation with said data racks; of an item counter apparatus remotely controlled from said accounting machine and comprising an electrical power supply, several counter sections structurally separate and distinct from said accumulator sections, each of said counter sections corresponding to a different one of said accumulator sections and including a number of counters each corresponding to a different one of the accumulators of a corresponding accumulator section, several counter actuating sections each corresponding to a different one of said counter sections and including a number of counter actuating members each connected to a different one of the counters of a corresponding counter section, several electrical drive means each corresponding to and adapted to be coupled to a different counter actuating section, an electrical coupling section including a multiplicity of electrically operated coupling members corresponding in number to the number of counter actuating members of only one of said counter sections, each of said electrically operated coupling members being common to and cooperating jointly with a different one of the counter actuating members of several counter actuating sections for coupling a counter actuating member of each of said counter actuating sections to the electrical drive means for that counter actuating section, multiple position switch means operable from said accumulator selection means controlling the energization from said power supply of a selected one of said electrically operated coupling members, and additional switching means operated from said accumulator section selection means controlling the energization from said power supply of the electrical drive means corresponding to a selected accumulator section.

5. The combination in accordance with claim 4 above including timing switch means operated from and after initiation of a cycle of operation of said accounting machine for completing an energizing circuit to an electrical drive means selected through said additional switching means.

6. The combination in accordance with claim 4 above including timing switch means operated from and after initiation of a cycle of operation of said accounting machine for completing an energizing circuit to an electrical drive means selected through said additional switching means and to an electrically operated coupling member selected through said multiple position switch means.

7. The combination in accordance with claim 4 above including further switching means in circuit with said electrical drive means and preventing operation of said counter apparatus in the absence of the entry of an amount into the accounting machine from the keyboard.

8. The combination in accordance with claim 4 above including further switching means actuated by movement of one of the data racks of the accounting machine past a predetermined position controlling the energization of said electrical drive means.

9. The combination in accordance with claim 4 above including further switching means actuated by movement of one of the data racks of the accounting machine past a predetermined position controlling the energization of said electrical drive means and said electrically operated coupling members.

10. The combination with a key-set, cyclically operable accounting machine having a keyboard for entering data therein and initiating cyclical operations thereof, a plurality of differentially positionable data racks, several accumulator sections each having the same number of accumulators for storing data entered in said accounting machine, accumulator selection means selecting an accumulator in each accumulator section for cooperation with said data racks, and accumulator section selection and function control means affording a selection of any of said accumulator sections for cooperation with said data racks and including selectively actuable non-add control means, total taking control means and sub-total taking control means for each of said accumulator sections; of an item counter apparatus controlled from said accounting machine and comprising an electrical power supply, several counter sections structurally separate and distinct from said accumulator sections, each of said counter sections corresponding to a different one of said accumulator sections and including a number of counters each corresponding to a different one of the accumulators of the accumulator section for a corresponding counter section, several counter actuating sections each corresponding to a different one of said counter sections and including a number of counter actuating members each connected to a different one of the counters of a counter section for a corresponding counter actuating section, several electrical drive means each corresponding to a different counter actuating section and adapted to be coupled thereto, an electrical coupling section including a multiplicity of electrically operated coupling members corresponding in number to the number of counter actuating members of only one of said counter sections, each of said electrically operated coupling members cooperating jointly with a different one of the counter actuating members of several counter actuating sections for coupling a counter actuating member of each of said counter actuating sections to the electrical drive means for that counter actuating section, multiple position switch means operable from said accumulator selection means controlling the energization from said power supply of a selected one of said electrically operated coupling members, and additional switching means operated from said accumulator section selection and function control means controlling the energization from said power supply of the electrical drive means corresponding to a selected accumulator section and preventing energization of an electrical drive means corresponding to an accumulator section selected from any of the non-add control means, total taking control means and sub-total taking control means for that accumulator section.

11. The combination with a key-set, cyclically operable accounting machine having a keyboard for entering data therein and initiating cyclical operations thereof, a plurality of differentially positionable data racks, several accumulator sections each having the same number of accumulators for storing data entered in said accounting machine, accumulator selection means selecting an accumulator in each accumulator section for cooperation with said data racks, and accumulator section selection and function control means affording a selection of any of said accumulator sections for cooperation with said data racks and including selectively actuable non-add control means for each of said accumulator sections; of an item counter apparatus controlled from said accounting machine and comprising an electrical power supply, several counter sections structurally separate and distinct from said accumulator sections, each of said counter sections corresponding to a different one of said accumulator sections and including a number of counters each corresponding to a different one of the accumulators of the accumulator section for a corresponding counter section, several counter actuating sections each corresponding to a different one of said counter sections and including a number of counter actuating members each connected to a different one of the counters of a counter section for a corresponding counter actuating section, several electrical drive means each corresponding to a different counter actuating section and adapted to be coupled thereto, an electrical coupling section including a multiplicity of electrically operated coupling members corresponding in number to the number of counter actuating members of only one of said counter sections, each of said electrically operated coupling members cooperating jointly with a different one of the counter actuating members of several counter actuating sections for coupling a counter actuating member of each of said counter actuating sections to the electrical drive means for that counter actuating section, multiple position switch means operable from said accumulator selection means controlling the energization from said power supply of a selected one of said electrically operated coupling members, and additional switching means operated from said accumulator section selection and function control means controlling the energization from said power supply of the electrical drive means corresponding to a selected accumulator section, but preventing energization of an electrical drive means corresponding to an accumulator section selected from the non-add control means for that accumulator section.

12. The combination with a key-set, cyclically operable accounting machine having a keyboard for entering data therein and initiating cyclical operations thereof, a plurality of differentially positionable data racks, several accumulator sections each having the same number of accumulators for storing data entered in said accounting machine, accumulator selection means selecting an accumulator in each accumulator section for cooperation with said data racks, and accumulator section selection and function control means affording a selection of any of said accumulator sections for cooperation with said data racks and including selectively actuable total taking control means and sub-total taking control means for each of said accumulator sections; of an item counter apparatus controlled from said accounting machine and comprising an electrical power supply, several counter sections structurally separate and distinct from said accumulator sections, each of said counter sections corresponding to a different one of said accumulator sections and including a number of counters each corresponding to a different one of the accumulators of the accumulator section for a corresponding counter section, several counter actuating sections each corresponding to a different one of said counter sections and including a number of counter actuating members each connected to a different one of the counters of a counter section for a corresponding counter actuating section, several electrical drive means each corresponding to a different counter actuating section and adapted to be coupled thereto, an electrical coupling section including a multiplicity of electrically operated coupling members corresponding in number to the number of counter actuating members of only one of said counter sections, each of said electrically operated coupling members cooperating jointly with a different one of the counter actuating members of several counter actuating sections for coupling a counter actuating member of each of said counter actuating sections to the electrical drive means for that counter actuating section, multiple position switch means operable from said accumulator selection means controlling the energization from said power supply of a selected one of said electrically operated coupling members, and additional switching means operated from said accumulator section selection and function control means controlling the energization from said power supply of the electrical drive means corresponding to a selected accumulator section, but preventing energization of an electrical drive means corresponding to an accumulator section selected from either the total taking control means and the sub-total taking control means for that accumulator section.

13. The combination with a key-set, cyclically operable accounting machine having a keyboard for entering data therein and initiating cyclical operations thereof, a plurality of differentially positionable data racks, several accumulator sections each having the same number of accumulators for storing data entered in said accounting machine, accumulator selection for cooperation with said data racks, and accumulator section selection and function control means affording a selection of any of said accumulator sections for cooperation with said data racks and including selectively actuable total taking control means and sub-total taking control means for each of said accumulator sections; of an item counter apparatus controlled from said accounting machine and comprising an electrical power supply, several counter sections structurally separate and distinct from said accumulator sections, each of said counter sections corresponding to a different one of said accumulator sections and including a number of counters each corresponding to a different one of the accumulators of the accumulator section for a corresponding counter section, several counter actuating sections each corresponding to a different one of said counter sections and including a number of counter actuating members each connected to a different one of the counters of a counter section for a corresponding counter actuating section, several electrical drive means each corresponding to a different counter actuating section and adapted to be coupled thereto, an electrical coupling section including a multiplicity of electrically operated coupling members corresponding in number to the number of counter actuating members of only one of said counter sections each of said electrically operated coupling members cooperating jointly with a different one of the counter reactuating members of several counter actuating sections for coupling a counter actuating member of each of said counter actuating sections to the electrical drive means for that counter actuating section, multiple position switch means operable from said accumulator selection means controlling the energization from said power supply of a selected one of said electrically operated coupling members, additional switching means operated from said accumulator section selection and function control means controlling the energization from said power supply of the electrical drive means corresponding to a selected accumulator section, and further switching means operated from said total taking control means and sub-total taking control means preventing energization of an electrical drive means corresponding to an accumulator section selected from either of said total taking control means and sub-total control means for that accumulator section.

References Cited in the file of this patent
UNITED STATES PATENTS

| | | |
|---|---|---|
| 2,613,872 | Brown | Oct. 14, 1952 |
| 2,812,902 | Runde et al. | Nov. 12, 1957 |
| 2,955,755 | Bradshaw | Oct. 11, 1960 |